United States Patent
Kageyama et al.

(10) Patent No.: US 10,297,839 B2
(45) Date of Patent: May 21, 2019

(54) FUEL CELL STACK AND LOAD BEARING METHOD INVOLVING USE OF FUEL CELL STACK

(71) Applicant: Nissan Motor Co., Ltd., Kanagawa (JP)

(72) Inventors: Kazuhiro Kageyama, Kanagawa (JP); Takanori Oku, Kanagawa (JP); Hiromi Sugimoto, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 179 days.

(21) Appl. No.: 14/649,698

(22) PCT Filed: Nov. 18, 2013

(86) PCT No.: PCT/JP2013/081004
§ 371 (c)(1),
(2) Date: Jun. 4, 2015

(87) PCT Pub. No.: WO2014/091878
PCT Pub. Date: Jun. 19, 2014

(65) Prior Publication Data
US 2015/0325875 A1 Nov. 12, 2015

(30) Foreign Application Priority Data
Dec. 13, 2012 (JP) .................................. 2012-272237

(51) Int. Cl.
*H01M 8/24* (2016.01)
*H01M 8/02* (2016.01)
(Continued)

(52) U.S. Cl.
CPC ....... *H01M 8/0273* (2013.01); *H01M 8/0271* (2013.01); *H01M 8/248* (2013.01); *H01M 2008/1095* (2013.01)

(58) Field of Classification Search
CPC ............. H01M 8/0297; H01M 8/0271; H01M 8/0276; H01M 8/0273; H01M 8/028;
(Continued)

(56) References Cited

U.S. PATENT DOCUMENTS

| 2007/0082250 A1* | 4/2007 | Suzuki et al. .......... | H01M 8/02 429/35 |
| 2008/0220312 A1* | 9/2008 | Kato ....................... | H01M 8/02 429/36 |

(Continued)

FOREIGN PATENT DOCUMENTS

| CN | 101140982 A | 3/2008 |
| JP | 2010-123377 A | 6/2010 |

OTHER PUBLICATIONS

Federal Register, vol. 76, No. 27 issued Feb. 9, 2011, pp. 7162-7175, which details Supplementary Examination Guidelines for Determining Compliance with 35 U.S.C. 112 and for Treatment of Related Issues in Patent Applications.*

(Continued)

*Primary Examiner* — Amanda J Barrow
(74) *Attorney, Agent, or Firm* — Osha Liang LLP

(57) ABSTRACT

A fuel cell stack has stacked individual fuel cells, each of the fuel cells having a cell frame, and an anode separator and a cathode separator disposed on respective sides of the cell frame, in which an electrolyte membrane joined with an anode side gas diffusion layer and a cathode side gas diffusion layer on respective sides thereof is disposed in the cell frame, an anode side load bearing member that bonds and fixes the anode separator, the cell frame, and the gas diffusion layer to each other, so as to receive a compressive load acting in a stacking direction of the fuel cell, and a cathode side load bearing member that bonds and fixes the cathode separator, the cell frame, and the gas diffusion layer
(Continued)

to each other so as to receive a compressive load acting in the stacking direction of the fuel cell.

7 Claims, 7 Drawing Sheets

(51) Int. Cl.
　　　H01M 8/0273　　(2016.01)
　　　H01M 8/248　　　(2016.01)
　　　H01M 8/0271　　(2016.01)
　　　H01M 8/1018　　(2016.01)
(58) Field of Classification Search
　　　CPC ...... H01M 8/24; H01M 8/2404; H01M 8/242;
　　　　　　　　　　　　　　　H01M 8/245; H01M 8/246
　　　See application file for complete search history.

(56) References Cited

U.S. PATENT DOCUMENTS

2010/0297533 A1* 11/2010 Takeshita ............ H01M 8/0273
　　　　　　　　　　　　　　　　　　　　429/508
2011/0236784 A1*　9/2011 Uehara et al. .......... H01M 8/24
　　　　　　　　　　　　　　　　　　　　429/469

OTHER PUBLICATIONS

International Preliminary Report on Patentability issued in PCT/JP2013/081004 dated May 21, 2014 (18 pages).

* cited by examiner

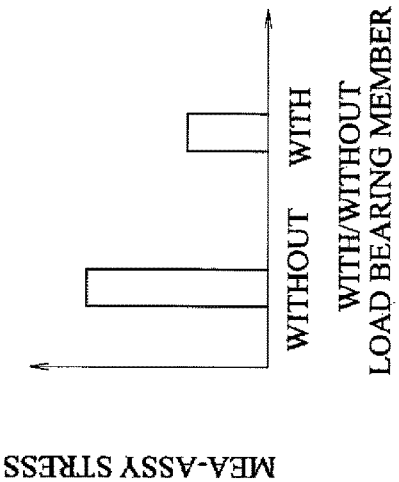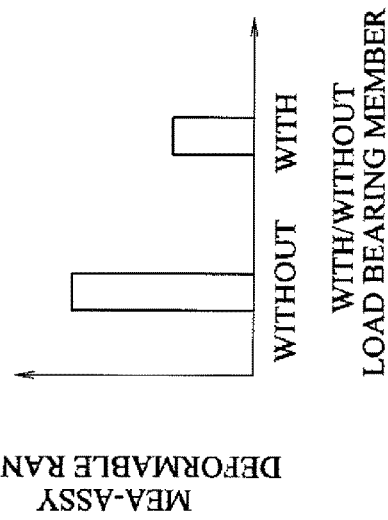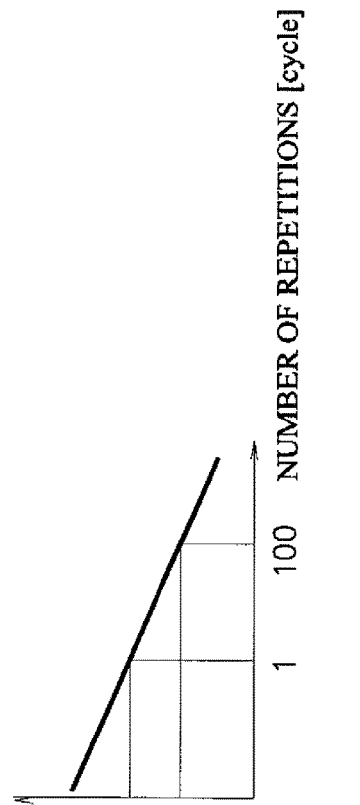

FUEL CELL STACK AND LOAD BEARING METHOD INVOLVING USE OF FUEL CELL STACK

CROSS-REFERENCE TO RELATED APPLICATIONS

The present invention is a national stage application of PCT Application No. PCT/JP2013/081004, filed Nov. 18, 2013, which claims priority from Japanese Patent Application No. 2012-272237, filed Dec. 13, 2012, the contents of which are hereby incorporated herein in their entirety.

BACKGROUND

Technical Field

The present invention relates to a fuel cell stack including a stacked plurality of fuel cells and a load bearing method involving the use of the fuel cell stack.

Related Art

The fuel cell stack disclosed in Patent Document 1 is constituted by a stacked plurality of single cells each including a membrane electrode assembly, which further includes insulating members with electrically insulating property formed along the outer periphery of each membrane electrode assembly and a bonding member that joins the insulating members of adjacent single cells.

CITATION LIST

Patent Literature

Patent Document 1: Japanese Patent Unexamined Publication No. 2010-123377

SUMMARY OF INVENTION

In the fuel cell stack described in Patent Document 1, since the insulating members are joined to each other through the bonding member, the insulating members can be prevented from cracking by allowing the bonding member to deform such that the insulating members follow a deformation of the fuel cell stack in the stacking direction.

However, this bonding member does not have a function of receiving a load acting on the anode separators and the cathode separators. Further, a gas diffusion layer of the anode electrode and a gas diffusion layer of the cathode electrode expand and shrink according to pulsation of anode gas or pulsation caused by a difference between anode gas and cathode gas. Accordingly, there is undeniable possibility that the membrane electrode assembly is subjected to repetitive stress due to such expansion and shrinkage and is eventually damaged or the like.

A fuel cell stack according to one or more embodiments of the present invention may receive a compressive load acting in the stacking direction of its individual fuel cells and also cancel the effect of a tensile load acting in the stacking direction, and a load bearing method involving the use of the fuel cell stack.

A fuel cell stack according to one or more embodiments of the present invention includes stacked individual fuel cells, each of the individual fuel cells including a cell frame in which a membrane electrode assembly joined with an anode side gas diffusion layer and a cathode side gas diffusion layer on respective sides thereof is disposed and an anode separator and a cathode separator disposed on respective sides of the cell frame; an anode side load bearing member that bonds and fixes the anode separator, the cell frame and the gas diffusion layer to each other so as to receive a compressive load acting in a stacking direction of the fuel cell; and a cathode side load bearing member that bonds and fixes the cathode separator, the cell frame and the gas diffusion layer to each other so as to receive a compressive load acting in the stacking direction of the fuel cell, wherein a load cancelling means to decrease the adhesion strength so as to cancel an effect of a tensile load acting in the stacking direction of the fuel cell is provided in the anode side load bearing member or the cathode side load bearing member or both of the anode side load bearing member and the cathode side load bearing member.

In this configuration, the anode side load bearing member and the cathode side load bearing member receive a compressive load acting in the stacking direction of the fuel cell. When the fuel cell stack is subjected to a tensile load in the stacking direction of the fuel cell, a load cancelling means cancels the effect of the tensile load. In this way, a compressive load acting in the stacking direction of the fuel cell can be received, and also the effect of a tensile load acting in the stacking direction is cancelled.

In one or more embodiments of the present invention, the anode side load bearing member and the cathode side load bearing member receive a compressive load acting in the stacking direction of the fuel cell. When the fuel cell stack is subjected to a tensile load in the stacking direction of the fuel cell, the load canceling member cancels the effect of the tensile load. Therefore, a compressive load acting in the stacking direction of the fuel cell can be received, and also the effect of a tensile load acting in the stacking direction can be canceled. As a result, the membrane electrode assembly can be prevented from breakage or the like.

BRIEF DESCRIPTION OF DRAWINGS

FIG. 6(A) illustrates the relationship between deformation of a membrane electrode assembly and the anode/cathode side load bearing members, FIG. 6(B) illustrates the relationship between stress on the membrane electrode assembly and presence/absence of the anode/cathode side load bearing members, and FIG. 6(C) illustrates the relationship between repetitive bending stress on the membrane electrode assembly and the number of repetitions.

DETAILED DESCRIPTION

Figure 1:
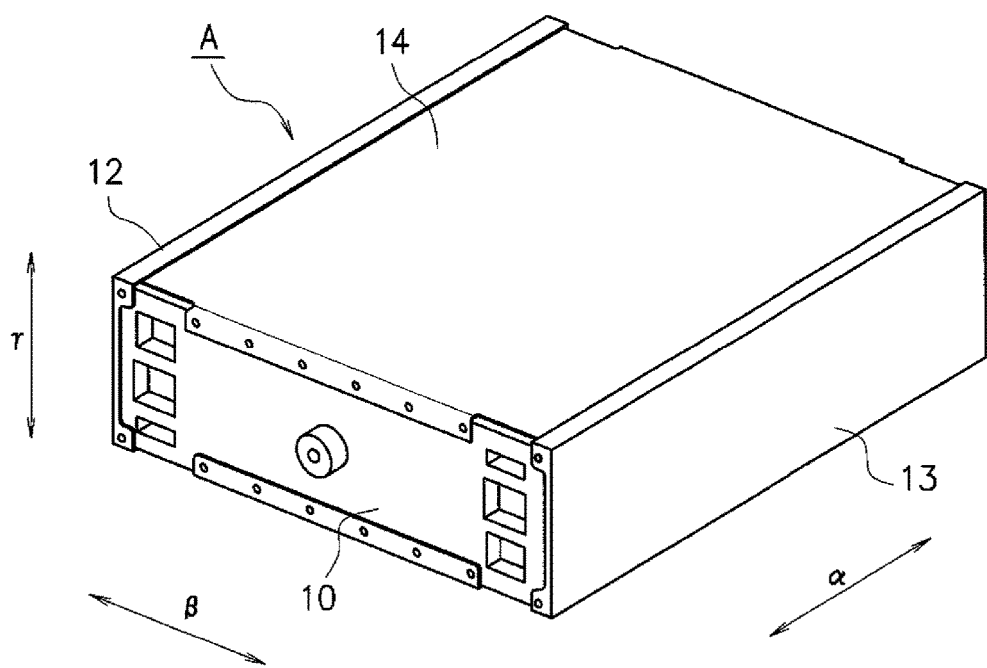
FIG. 1 is a perspective view of a fuel cell stack according to one or more embodiments of the present invention.
Figure 2:
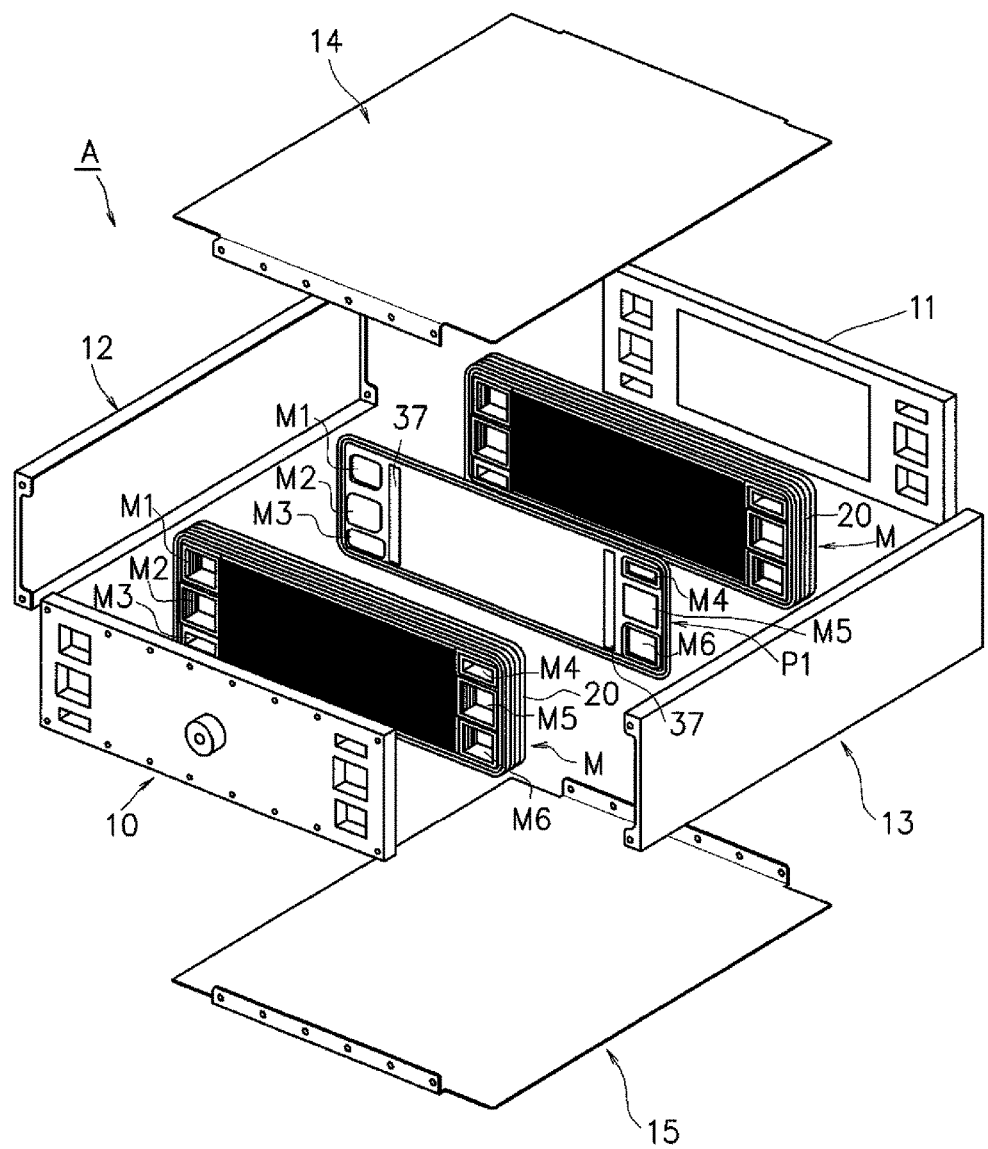
FIG. 2 is an exploded perspective view of the same fuel cell stack.
Figure 3:
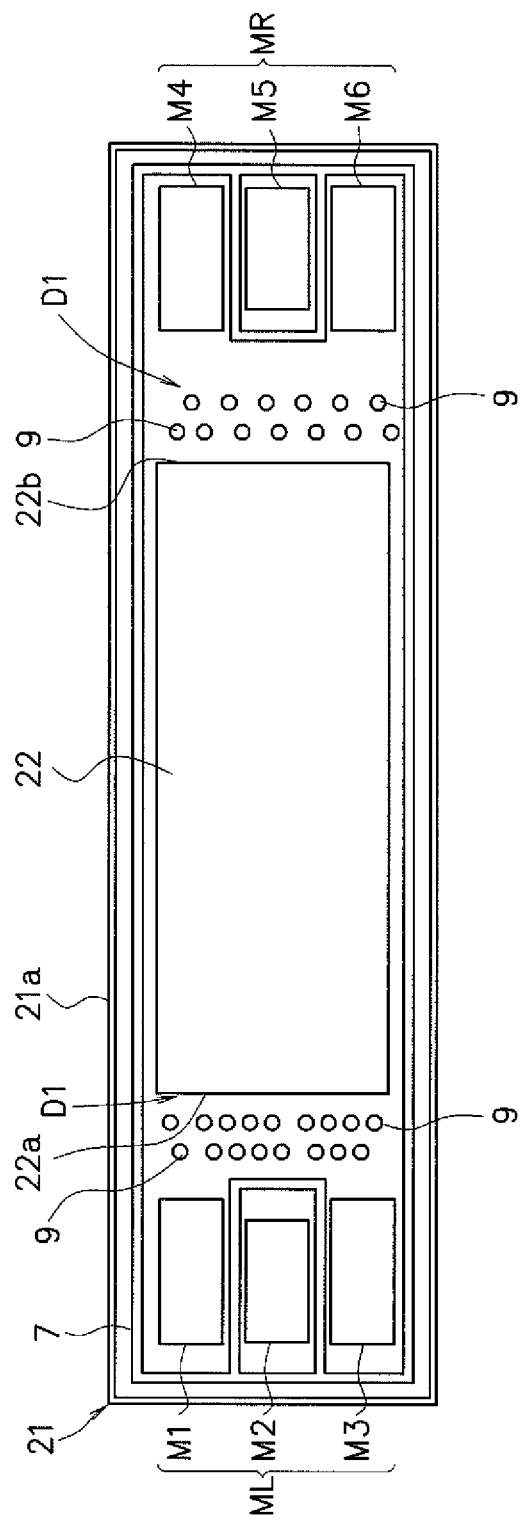
FIG. 3 is an enlarged front view of a cell frame, which is a component of a fuel cell.
Figure 4:
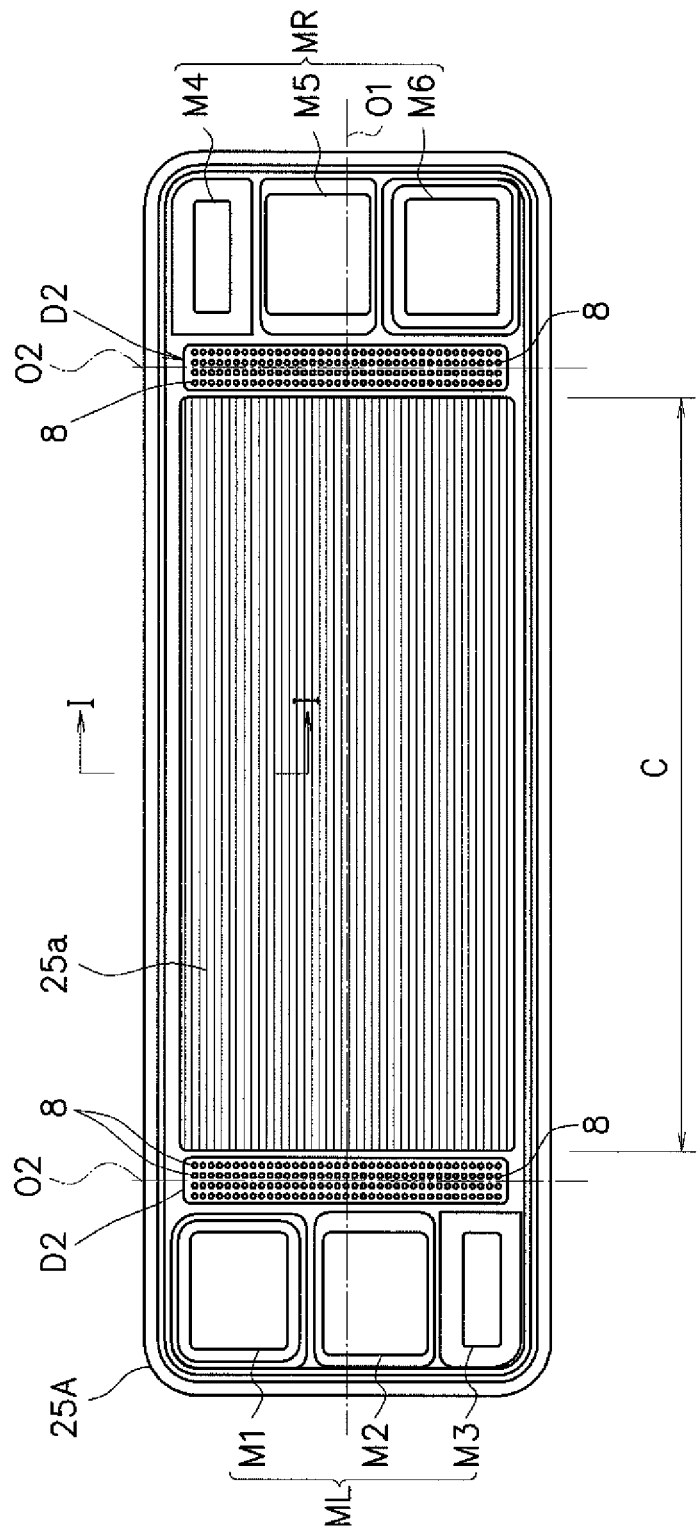
FIG. 4 is an enlarged front view of a separator, which is a component of a fuel cell.
Figure 5:
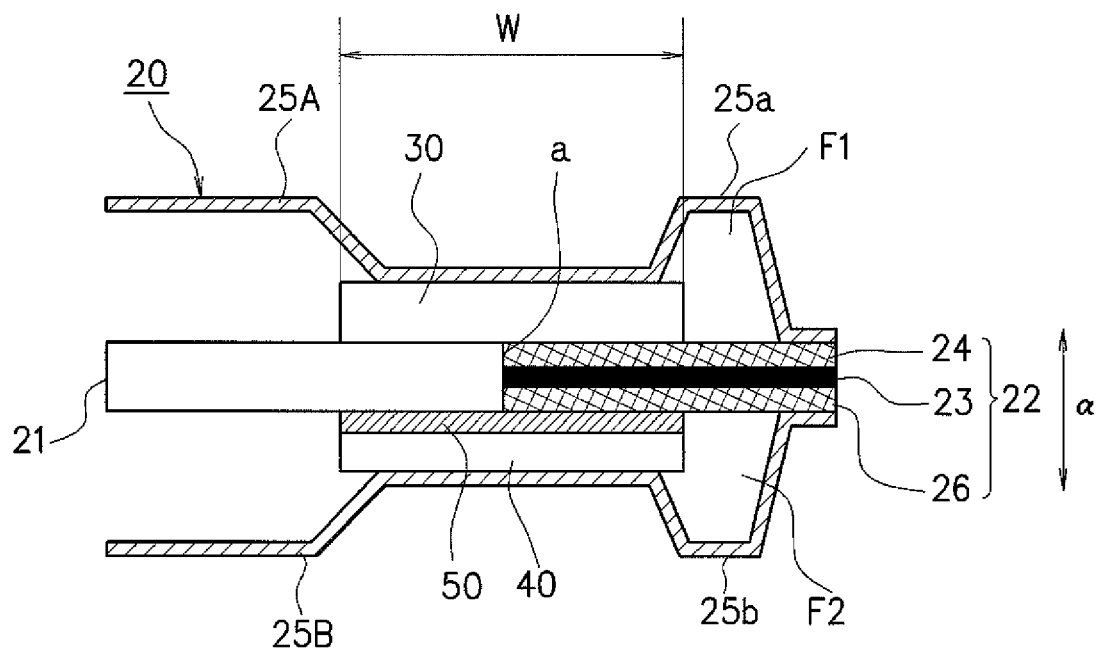
FIG. 5 is an enlarged partial cross sectional view taken along the line I-I of FIG. 4, illustrating a load canceling means according to a first embodiment.

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a perspective view of a fuel cell stack according to one or more embodiments of the present invention, FIG. 2 is an exploded perspective view of the fuel cell stack, and FIG. 3 is an enlarged front view of a cell frame which is a component of a fuel cell. Further, FIG. 4 is an enlarged front view of a separator which is a component of the fuel cell, and FIG. 5 is an enlarged partial cross sectional view taken along the line I-I of FIG. 4, illustrating a load canceling means according to a first embodiment.

(First Embodiment)

As illustrated in FIG. 1 and FIG. 2, a fuel cell stack A according to one or more embodiments of the present invention includes: a pair of end plates 10, 11; fuel cell modules M, M and sealing plates P1 that are stacked together and interposed between the pair of end plates 10, 11; and fastening plates 12, 13 and reinforce plates 14, 15 that fasten the fuel cell stack such that the end plates 10, 11 clamp the fuel cell modules M, M and sealing plates P1 therebetween.

Each of the cell modules M includes a required number of stacked individual fuel cells 20. The outer walls of the cell module M is molded by an adhesive layer. This configuration prevents water from penetrating into the cell modules M and also provides electrical insulation.

Each of the individual fuel cells 20 includes a cell frame 21 and anode and cathode separators 25A, 25B disposed on respective sides of the cell frame 21 such that they define gas channels F1, F2 (see FIG. 5) through which two different gases for power generation flow respectively.

The term "two different gases for power generation" refers to hydrogen-containing gas and oxygen containing gas.

The cell frame 21 is made of resin. In the first embodiment, as illustrated in FIG. 3, the cell frame 21 is formed in a horizontally long rectangular shape with a constant thickness in a front view from the stacking direction α of the fuel cells 20. In the center part of the cell frame 21, a membrane electrode assembly 22 is provided, and manifold portions ML, MR are arranged on both sides (both ends) of the membrane electrode assembly 22.

The membrane electrode assembly 22, which is also referred to as an MEA, includes, for example, an electrolyte membrane 23 of a solid polymer, and a fuel-side gas diffusion layer 24 and an oxidant-side gas diffusion layer 26 disposed on respective sides of the electrolyte membrane 23.

The manifold portions ML, MR are configured to allow the hydrogen-containing gas, the oxygen-containing gas and cooling fluid to flow in/out through them individually. Between the manifold portions ML, MR and the membrane electrode assembly 22, diffuser areas D1, D1 for the hydrogen-containing gas and the oxygen-containing gas are formed.

In the first embodiment, the cooling fluid is "water".

The manifold portion ML on one side is composed of manifold holes M1 to M3.

The manifold holes M1 to M3 are configured respectively to supply the hydrogen-containing gas (M1), to supply the cooling fluid (M2) and to supply the oxygen-containing gas (M3). They form respective channels in the stacking direction α.

The manifold portion MR on the other side is composed of manifold holes M4 to M6.

The manifold holes M4 to M6 are configured respectively to discharge the oxygen-containing gas (M4), to discharge the cooling fluid (M5) and to discharge the hydrogen-containing gas (M6). They form respective channels in the stacking direction α. The positional relationship of the manifold holes may be partly or fully reversed in respect of supply and discharge.

The diffuser areas D1 are disposed between the membrane electrode assembly 22 and the manifold portion ML and between the membrane electrode assembly 22 and the manifold portion MR. The diffuser areas D1 are formed on both sides of the cell frames 21.

In the diffuser areas D1, a plurality of protrusions 9, which are truncated cones with the same size and shape, are arranged in two rows at required intervals to align the flow. On the cell frame 21, endless adhesive sealer 7 is continuously formed along the outer edge over the whole periphery. The endless adhesive sealer 7 also encloses manifold holes M1, M2, M5 and M6.

The anode and cathode separators 25A and 25B are constituted by, for example, a press-molded metal plate of stainless steel or the like, which are formed in a horizontally long rectangular shape with approximately the same size as the cell frame 21.

The separators 25A, 25B include uneven channel forming portions 25a, 25b that continue in the longitudinal direction in the center part opposed to the membrane electrode assembly 22, and further have manifold holes M1 to M6 on the opposite sides that are opposed to and have the same size and shape as the manifold holes M1 to M6 of the cell frame 21 (see FIG. 4).

In the first embodiment, the area where the channel forming portions 25a, 25b are formed corresponds to an active area c.

Between the manifold portion ML and a gas inlet end of the channel forming portion 25a (25b) and between the manifold portion MR and a gas outlet end of the channel forming portion 25a (25b), gas diffuser areas D2, D2 are formed.

In the diffuser areas D2, a plurality of protrusions 8, which are truncated cones with the same size and shape, are arranged in matrix at required intervals.

The individual fuel cell 20 with the above-described configuration includes an anode side load bearing member 30, a cathode side load bearing member 40 and a load canceling means 50 as illustrated in FIG. 5.

The anode side load bearing member 30 bonds and fix the anode separator 25A and the gas diffusion layer 24 to each other so as to receive a compressive load acting in the stacking direction α of the fuel cells 20. For example, the anode side load bearing member 30 is constituted by an adhesive such as a silicon adhesive, an epoxy adhesive and an olefin adhesive.

The anode side load bearing member 30 is formed in a required thickness and a width W to cover a required area including a joining portion a between the cell frame 21 and the gas diffusion layer 24.

The cathode side load bearing member 40, which has the same material and shape as the anode side load bearing member 30, bonds and fixes the cathode separator 2511 and the gas diffusion layer 26 to each other so as to receive a compressive load acting in the stacking direction α of the fuel cells 20.

The load cancelling means 50 is interposed between the cathode side load bearing member 40 and a combination of the cell frame 21 and the gas diffusion layer 26. That is, the load canceling means 50 is disposed across the cell frame 21 and the gas diffusion layer 26 to cancel the effect of a tensile load acting in the stacking direction of the fuel cells 20.

The load canceling means 50 according to the first embodiment corresponds to an adhesion pretreatment agent applied to the cathode side load bearing member 40.

In the first embodiment, the load canceling means 50, the anode side load bearing member 30 and the cathode side load bearing member 40 are disposed along both long side edges of the active area c.

That is, by forming the load canceling member 50, the adhesion strength between the anode side load bearing member 30 and the combination of the cell frame 21 and the gas diffusion layer 24 becomes relatively strong. Accordingly, when the gas diffusion layers 24, 26 swell for example, the cathode side load bearing member 40 is detached from the cell frame 21 and the gas diffusion layer 26 where the adhesion strength is relatively low, so that the effect of the tensile load acting in the stacking direction α is cancelled.

As a result, the membrane electrode assembly 22, the cell frame 21 and the like are prevented from breakage.

FIG. 6(A) illustrates the relationship between deformation of the membrane electrode assembly and the anode/cathode side load bearing members, FIG. 6(B) illustrates the relationship between stress on the membrane electrode assembly and presence/absence of the anode/cathode side load bearing members, and FIG. 6(B) illustrates the relationship between repetitive bending stress on the membrane electrode assembly and the number of repetitions. In FIGS. 6(A)-6(C), the membrane electrode assembly is referred to as "MEA-ASSY", and the presence/absence of the anode/cathode side load bearing members are indicated as "with" or "without".

As can be seen from FIG. 6(A), provision of the anode/cathode side load bearing members 30, 40 reduces deformation of the membrane electrode assembly 22. As can be seen from FIG. 6(B), when the anode/cathode side load bearing members 30, 40 are provided, the membrane electrode assembly 22 is subjected to reduced stress. As can be seen from FIG. 6(C), when the anode/cathode side load bearing members 30, 40 are provided, the number of repetitions, i.e. the lifetime, is remarkably increased.

(Second Embodiment)

Figure 7:
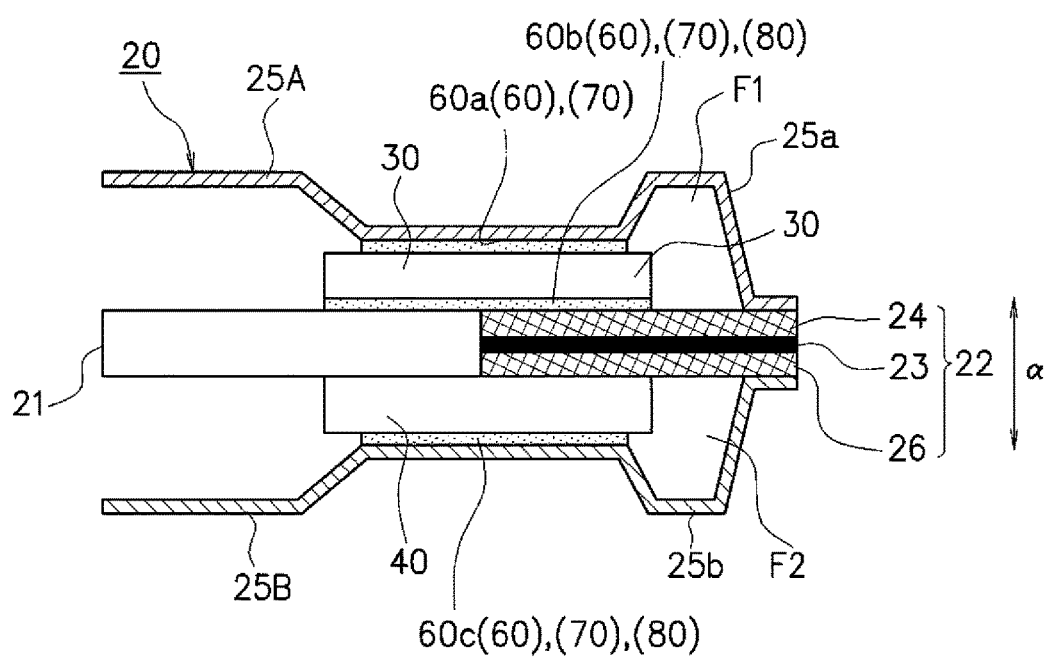
FIG. 7 is a partial cross sectional view taken along the line I-I of FIG. 4, illustrating a load cancelling member according to a second embodiment.

FIG. 7 is a partial cross sectional view taken along the line I-I of FIG. 4, illustrating a load cancelling means according to a second embodiment. The same reference signs are denoted to the same components as those of one or more of the above-described embodiments, and the description thereof is omitted.

A load cancelling means 60 according to the second embodiment corresponds to adhesive pretreatment agents 60a to 60c applied between an anode side load bearing member 30 and an anode separator 25A, between the anode side load bearing member 30 and a combination of a cell frame 21 and a gas diffusion layer 24, and between a cathode separator 25B and a cathode side load bearing member 40. This load cancelling means 60 is also disposed across the cell frame 21 and the gas diffusion layer 24 so as to cancel the effect of a tensile load acting in the stacking direction of fuel cells 20.

Forming the adhesive pretreatment agents 60a to 60c improves respectively the adhesion strength between the anode separator 25A and the combination of the cell frame 21 and the gas diffusion layer 24, the adhesion strength between the combination of the cell frame 21 and the gas diffusion layer 24 and the anode side load bearing member 30, and the adhesion strength between the cathode separator 25B and the cathode side load bearing member 40.

Accordingly, when the gas diffusion layers 24, 26 swell for example, the cathode side load bearing member 40 is detached from the cathode separator 25B and the gas diffusion layer 25 where the adhesion strength is relatively low. As a result, the membrane electrode assembly 22, the frame 21 and the like can be prevented from breakage.

In the embodiment of FIG. 7, the adhesive pretreatment agents 60a to 60c are applied. Instead of the adhesive pretreatment agents, a surface treatment 80 such as surface roughening by means of UV, corona, plasma, blast or the like may be provided as a load cancelling means 70 according to a third embodiment.

Also in this case, when the gas diffusion layers 24, 26 swell for example, the cathode side load bearing member 40 is detached from the cathode separator 25B and the gas diffusion layer 26 where the adhesion strength is relatively low. As a result, the membrane electrode assembly 22, the cell frame 21 and the like can be prevented from breakage.

In a load bearing method involving the use of the fuel cell stack, the anode side load bearing member 30 fixes the anode separator 25A, the cell frame 21 and the gas diffusion layer 24, 26 to each other to receive a compressive load acting in the stacking direction of the fuel cells 20, the cathode side load bearing member 40 fixes the cathode separator 25B, the cell frame 21 and the gas diffusion layer 24, 26 to each other to receive a compressive load acting in the stacking direction of the fuel cells 20, and the load cancelling means 50, 60, 70, 80 provided in the anode side load bearing member 30 or the cathode side load bearing member 40 or both of the anode and cathode side load bearing members 30, 40 cancels the effect of a tensile load acting in the stacking direction of the fuel cells 20.

The present invention is not limited to the above-described embodiments and, for example also includes the following variations. According to one or more embodiments of the present invention, any load cancelling means may be provided that is disposed in the anode side load bearing member 30 or the cathode side load bearing member 40 or both of them so as to cancel the effect of a tensile load acting in the stacking direction α of the fuel cells 20.

Specifically, such load cancelling means may be a combination of a load cancelling means applied between the anode side load bearing member 30 and the anode separator 25A or between the anode side load bearing member 30 and the combination of the cell frame 21 and the gas diffusion layer 24, and a load cancelling means applied between the combination of the cell frame 21 and the gas diffusion layer 25 and the cathode side load bearing member 40 or between the cathode separator 25B and the cathode side load bearing member 40.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

20 Fuel cell
21 Cell frame
22 Membrane electrode assembly
24, 26 Gas diffusion layer
25A Anode separator
25B Cathode separator
30 Anode side load bearing member
40 Cathode side load bearing member
50 Load cancelling means according to first embodiment 60 Load cancelling means according to second embodiment
60a to 60c Pretreatment agent
70 Load cancelling means according to third embodiment
80 Surface treatment
A Fuel cell stack
c Active area

The invention claimed is:
1. A fuel cell stack, comprising stacked individual fuel cells, wherein each of the fuel cells comprises:
a cell frame;
an anode separator and a cathode separator disposed on respective sides of the cell frame;
a membrane electrode assembly comprising an electrolyte membrane joined with an anode side gas diffusion layer and a cathode side gas diffusion layer on respective sides thereof, wherein the membrane electrode assembly is disposed in the cell frame;
an anode side load bearing member that bonds and fixes the anode separator, the cell frame, and the anode side gas diffusion layer to each other, the anode side load bearing member receiving a load acting in a stacking direction of the fuel cell; and
a cathode side load bearing member that bonds and fixes the cathode separator, the cell frame, and the cathode side gas diffusion layer to each other, the cathode side load bearing member receiving the load acting in the stacking direction of the fuel cell,
wherein a load cancelling treatment configured to reduce adhesion strength is provided to:
the anode side load bearing member, wherein the load cancelling treatment is configured to cancel an effect of the load acting in the stacking direction of the fuel cell by allowing the anode side load bearing member to detach from the cell frame and the anode gas diffusion layer such that the effect of the load acting in the stacking direction is cancelled; or
the cathode side load bearing member, wherein the load cancelling treatment is configured to cancel an effect of the load acting in the stacking direction of the fuel cell by allowing the cathode side load bearing member to detach from the cell frame and the cathode gas diffusion layer such that the effect of the load acting in the stacking direction is cancelled; or
both of the anode side load bearing member and the cathode side load bearing member, wherein the load cancelling treatment provided to the anode side load bearing member is configured to cancel an effect of the load acting in the stacking direction of the fuel cell by allowing the anode side load bearing member to detach from the cell frame and the anode gas diffusion layer such that the effect of the load acting in the stacking direction is cancelled, and wherein the load cancelling treatment provided to the cathode side load bearing member is configured to cancel an effect of the load acting in the stacking direction of the fuel cell by allowing the cathode side load bearing member to detach from the cell frame and the cathode gas diffusion layer such that the effect of the load acting in the stacking direction is cancelled.

2. The fuel cell stack according to claim 1, wherein the load cancelling treatment is provided across the cell frame and the membrane electrode assembly.

3. The fuel cell stack according to claim 1, wherein the load cancelling treatment is applying an adhesive pretreatment agent at least on an interface between the anode side load bearing member and the anode separator, an interface between the cathode side load bearing member and the cathode separator, an interface between the anode side load bearing member and an anode side surface of the cell frame and the membrane electrode assembly, or an interface between the cathode side load bearing member and a cathode side surface of the cell frame and the membrane electrode assembly.

4. The fuel cell stack according to claim 1, wherein the load cancelling treatment is a surface treatment provided at least on an interface between the anode side load bearing member and the anode separator, an interface between the cathode side load bearing member and the cathode separator, an interface between the anode side load bearing member and an anode side surface of the cell frame and the membrane electrode assembly, or an interface between the cathode side load bearing member and a cathode side surface of the cell frame and the membrane electrode assembly.

5. The fuel cell stack according to claim 1, wherein the load cancelling treatment, the anode side load bearing member, and the cathode side load bearing member are provided along side edges of active areas of the membrane electrode assembly, where channel forming portions of the anode separator and the cathode separator are formed.

6. A load bearing method using a fuel cell stack comprising stacked individual fuel cells, wherein each of the fuel cells comprises:
a cell frame,
an anode separator and a cathode separator disposed on respective sides of the cell frame;
a membrane electrode assembly comprising an electrolyte membrane joined with an anode side gas diffusion layer and a cathode side gas diffusion layer on respective sides thereof, wherein the membrane electrode assembly is disposed in the cell frame;
an anode side load bearing member that bonds and fixes the anode separator, the cell frame, and the anode side gas diffusion layer to each other; and
a cathode side load bearing member that bonds and fixes the cathode separator, the cell frame, and the cathode side gas diffusion layer to each other,
the load bearing method comprising:
providing a load cancelling treatment configured to reduce adhesion strength to:
the anode side load bearing member, wherein the load cancelling treatment is configured to cancel an effect of a load acting in a stacking direction of the fuel cell by allowing the anode side load bearing member to detach from the cell frame and the anode gas diffusion layer such that the effect of the load acting in the stacking direction is cancelled, or
the cathode side load bearing member, wherein the load cancelling treatment is configured to cancel an effect of the load acting in the stacking direction of the fuel cell by allowing the cathode side load bearing member to detach from the cell frame and the cathode gas diffusion layer such that the effect of the load acting in the stacking direction is cancelled, or
both of the anode side load bearing member and the cathode side load bearing member, wherein the load cancelling treatment provided to the anode side load bearing member is configured to cancel an effect of the load acting in the stacking direction of the fuel cell by allowing the anode side load bearing member to detach from the cell frame and the anode gas diffusion layer such that the effect of the load acting in the stacking direction is cancelled, and wherein the load cancelling treatment provided to the cathode side load bearing member is configured to cancel an effect of the load acting in the stacking direction of the fuel cell by allowing the cathode side load bearing member to detach from the cell frame and the cathode gas diffusion layer such that the effect of the load acting in the stacking direction is cancelled;

receiving the load acting in the stacking direction of the fuel cell by the anode side load bearing member and by the cathode side load bearing member; and cancelling an effect of the load acting in the stacking direction of the fuel cell by decreasing at least adhesion strength between the anode side load bearing member and the anode separator, adhesion strength between the cathode side load bearing member and the cathode separator, adhesion strength between the anode side load bearing member and an anode side surface of the cell frame and the membrane electrode assembly, or an interface between the cathode side load bearing member and a cathode side surface of the cell frame and the membrane electrode assembly.

7. The fuel cell stack according to claim 2, wherein the load cancelling treatment is applying an adhesive pretreatment agent at least on an interface between the anode side load bearing member and the anode separator, an interface between the cathode side load bearing member and the cathode separator, an interface between the anode side load bearing member and an anode side surface of the cell frame and the membrane electrode assembly, or an interface between the cathode side load bearing member and a cathode side surface of the cell frame and the membrane electrode assembly.

* * * * *